United States Patent
Huang

(10) Patent No.: US 8,614,736 B2
(45) Date of Patent: Dec. 24, 2013

(54) METHOD AND DEVICE FOR PRESENTING REASON PROMPT FOR VIDEO CALL FAILURE

(75) Inventor: Hui Huang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 296 days.

(21) Appl. No.: 12/753,545

(22) Filed: Apr. 2, 2010

(65) Prior Publication Data

US 2011/0019803 A1 Jan. 27, 2011

(30) Foreign Application Priority Data

Apr. 2, 2009 (CN) .......................... 2009 1 0081101

(51) Int. Cl.
*H04N 7/14* (2006.01)

(52) U.S. Cl.
USPC .................................. 348/14.11; 348/14.01

(58) Field of Classification Search
USPC ........................................... 348/14.01–14.11
See application file for complete search history.

(56) References Cited

U.S. PATENT DOCUMENTS

| | | | | |
|---|---|---|---|---|
| 7,912,020 | B2 * | 3/2011 | Khasawneh et al. | 370/338 |
| 2007/0126861 | A1 * | 6/2007 | Kim et al. | 348/14.02 |
| 2007/0127357 | A1 * | 6/2007 | Tamura | 370/202 |
| 2008/0309749 | A1 * | 12/2008 | Feng et al. | 348/14.01 |
| 2009/0225684 | A1 | 9/2009 | Cho et al. | |
| 2010/0145737 | A1 * | 6/2010 | Joao | 705/4 |

FOREIGN PATENT DOCUMENTS

| | | |
|---|---|---|
| CN | 1878288 A | 12/2006 |
| CN | 101277343 A | 10/2008 |
| EP | 1 890 500 A1 | 2/2008 |
| EP | 2120440 A1 | 11/2009 |
| JP | 11-177713 A * | 7/1999 |
| WO | WO 2008/119272 A1 | 10/2008 |

OTHER PUBLICATIONS

Communication in European Application No. 10159127.9-2223, mailed Aug. 19, 2010.
1st Office Action in corresponding Russian Application No. 2010112919 (Apr. 2, 2010).
1st Office Action in corresponding Chinese Patent Application No. 200910081101.5 (Oct. 16, 2012).

* cited by examiner

*Primary Examiner* — Duc Nguyen
*Assistant Examiner* — Theodore Ndje
(74) *Attorney, Agent, or Firm* — Leydig, Voit & Mayer, Ltd.

(57) ABSTRACT

A method for presenting a reason prompt for a video call failure includes: acquiring, by a network-side entity, a value of reason for a video call failure determined by an originating switch, with which a calling terminal is communicated; determining a reason prompt corresponding to the value of the reason for the video call failure; and presenting the reason prompt to the calling terminal. An embodiment of the present disclosure further provides a device for presenting a reason prompt for a video call failure and an originating switch apparatus. Reason prompts for video call failures can be updated dynamically at the network side, thereby guaranteeing the accuracy of reason prompts for video call failures presented to a calling subscriber, and improving the experience of the subscriber. Meanwhile, the operator can update a reason prompts for a video call failure in time, and the flexibility in operation at the operator side is enhanced.

12 Claims, 5 Drawing Sheets

METHOD AND DEVICE FOR PRESENTING REASON PROMPT FOR VIDEO CALL FAILURE

CROSS-REFERENCE TO RELATED APPLICATION

The present application claims priority to Chinese Patent Application No. 200910081101.5, filed on Apr. 2, 2009, entitled "Method and Device for Presenting Reason Prompt for Video Call Failure," which is hereby incorporated by reference in its entirety.

FIELD OF THE INVENTION

The present disclosure relates to the field of mobile communication technology, and more particularly to a method and device for presenting a reason prompt for a video call failure.

BACKGROUND OF THE INVENTION

A video call in Circuit Switch (CS) domain is a bearer service, in which an H.245 (H.245 protocol is a multimedia communication control protocol) negotiation is performed between a calling terminal and a called terminal in a way of peer to peer, and the network side does not participate in the media negotiation, media encoding/decoding and switching, etc., during the call. Therefore, the network side does not present a reason prompt for this video call failure to the calling subscriber when the video call fails.

To inform the calling subscriber of the reason for the video call failure, there is provided a solution in the prior art, in which a value of the reason for the video call failure is carried in a signaling, which is sent to the calling terminal, when the video call fails; in this way, the reason prompt for the video call failure can be presented to the calling subscriber according to the value of the reason for the video call failure carried in the signaling after the calling terminal receives the signaling; moreover, the reason prompt presented at the calling terminal is set before the terminal is shipped.

The inventors find that the prior art at least has the following problems during implementation of the present disclosure.

With the rapid development of telecommunications service, reasons for video call failures are updated and expanded in high rate, which leads to the result that reason prompts for video call failures presented to the subscriber by the calling terminal may be incorrect or imperfect, thereby deteriorating the experience of the subscriber.

SUMMARY OF THE INVENTION

The embodiments of the present disclosure provides a method and device for presenting a reason prompt for a video call failure so as to improve the experience of a subscriber and network operation and management performance.

A method for presenting a reason prompt for a video call failure includes:
acquiring, by a network-side entity, a value of reason for a video call failure determined by an originating switch, with which a calling terminal is communicated;
determining, by the network-side entity, a reason prompt corresponding to the value of the reason for the video call failure; and
presenting, by the network-side entity, the reason prompt to the calling terminal.

A device for presenting a reason prompt for a video call failure includes:
a message receiving module, configured to acquire a value of reason for a video call failure determined by an originating switch, with which a calling terminal is communicated;
an information searching module, configured to determine a reason prompt corresponding to the value of the reason for the video call failure acquired by the message receiving module; and
a prompt presenting module, configured to present the reason prompt to the calling terminal.

An originating switch apparatus includes the above device for presenting a reason prompt for a video call failure.

It can be seen from the technical solutions provided by the embodiments of the present disclosure that in the embodiments of the present disclosure, contents of reason prompts can be set at the network side since reason prompts for video call failures are presented to a calling terminal through the network-side entity, thereby guaranteeing the accuracy of the reason prompts for the video call failures presented to the calling terminal, and improving the experience of the subscriber.

BRIEF DESCRIPTION OF THE DRAWINGS

To describe the technical solutions of the embodiments of the present disclosure or of the prior art more clearly, a brief introduction will be made to the drawings necessary for the description of the embodiments or the prior art. Obviously, the drawings in the following description only relate to some embodiments of the present disclosure, and other drawings can be obtained according to the drawings without creative work for persons skilled in the art.

DETAILED DESCRIPTION OF THE EMBODIMENTS

The technical solutions of the embodiments of the present disclosure will be described clearly and completely with reference to the drawings in the embodiments of the present disclosure. It is obvious that the embodiments described below are only a part of the embodiments of the present disclosure other than all the embodiments. Based on the embodiments of the present disclosure, all the other embodiments can be obtained by persons skilled in the art without creative work, which also fall within the protection scope of the present disclosure.

Figure 1:
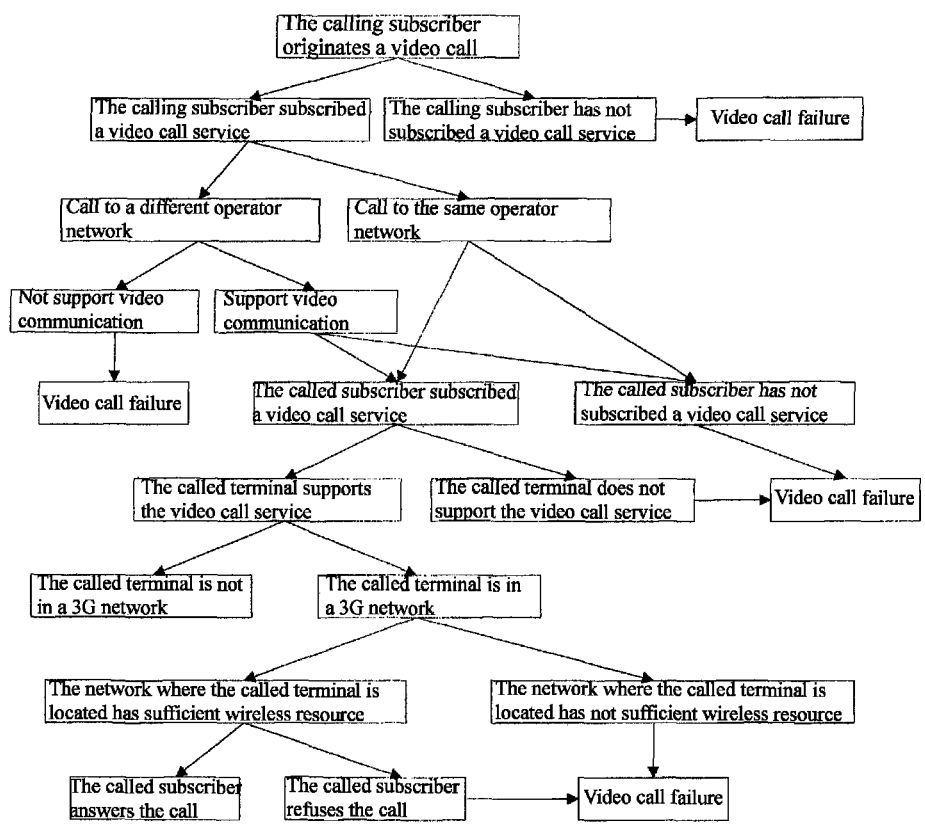
FIG. 1 is a schematic diagram illustrating the reason for a video call failure according to an embodiment of the present disclosure.

There exists a plurality of situations where a video call fails. According to the schematic diagram illustrating reason for a video call failure as shown in FIG. 1, it can be seen that a video call may fail in each of stages of the video call; for example, a video call originated by a calling subscriber may fail because the calling subscriber does not subscribe to video call service; when the called party is paged through an operator network, the video call may also fail because the called subscriber does not subscribe to video call service, etc. When the video call fails due to a certain reason as shown in FIG. 1A, a value of reason for the video call failure will be sent to the calling terminal through a signaling. During implementation of the present disclosure, the inventors find that the signaling carrying the value of the reason for the video call failure, which is sent to the calling terminal, first arrives at an originating switch apparatus, with which the calling terminal is communicated, as an access network equipment paging the calling terminal.

When the video call originated by the calling terminal fails, a method for presenting a reason prompt for a video call failure according to an embodiment of the present disclosure includes: acquiring, by a network-side entity, a value of reason for the video call failure sent from an originating switch, with which the calling terminal is communicated; determining, by the network-side entity, a reason prompt corresponding to the value of the reason for the video call failure; and presenting, by the network-side entity, the reason prompt to the calling terminal, wherein the value of the reason for the video call failure is configured to indicate the reason for the video call failure, and the originating switch is a switch apparatus in an access network, with which the calling terminal is communicated, such as Mobile Switching Center (MSC) Server.

In the embodiment of the present disclosure, the network-side entity presents the reason prompt for the video call failure to the calling subscriber, and thus the reason prompt can be set at the network side so that the reason prompt for the video call failure acquired by the calling subscriber is more accurate and the experience of the subscriber is improved. In the embodiment of the present disclosure, the process of presenting the reason prompt may further include: establishing, by the originating switch, a connection with the calling terminal; and presenting the reason prompt to the calling terminal through the established connection with the calling terminal. The process may further include: establishing, by the originating switch, a 3G-324M connection with the calling terminal; performing an H.245 negotiation with the calling terminal through the connection; and presenting the reason prompt to the calling terminal after the negotiation is successful. After the reason prompt is presented, the established connection with the calling terminal is released. The process of releasing the established connection with the calling terminal may be performed by the network-side entity voluntarily or performed by the calling terminal.

In addition, since reason prompts are set at the network side, the technical solution according to the embodiment of the present disclosure enables the operator to set reason prompts for video call failures in accordance with its needs. For example, an ad is inserted during the process of presenting the reason prompt for the video call failure. To acquire feedback information from the subscriber with respect to the reason prompt for the video call failure, in the embodiment of the present disclosure, the feedback information from the subscriber with respect to the reason prompt for the video call failure can be received before the established connection with the calling terminal is released, so that the network side performs a corresponding operation according to the feedback information. For example, the operator inserts ad information when presenting the reason prompt for the video call failure, the subscriber instructs to acquire the relevant content presented in the ad information through the feedback information, and the network-side entity processes the request of acquiring the relevant content presented in the ad information in response to the received feedback information. This may be implemented by collecting the feedback information sent by the calling terminal through a Dual Tone Multi-Frequency (DTMF) number collecting apparatus.

In the embodiment of the present disclosure, the process of determining the reason prompt corresponding to the value of the reason for the video call failure may further include: acquiring the reason prompt corresponding to the value of the reason for the video call failure based on a saved correspondence between values of reason for video call failures and reason prompts. As an example other than a limitation, the correspondence between values of reason for video call failures and reason prompts may be saved by saving a list (list A) of values of reason for video call failures and a list (list B) of reason prompts respectively and saving the mapping relationship between list A and list B; or saving a mapping relationship table of values of reason for video call failures and reason prompts, as shown Table 1:

TABLE 1

| Value of reason for video call failure | Reason prompt |
| --- | --- |
| Value of reason for video call failure 1 | Reason prompt 1 |
| Value of reason for video call failure 2 | Reason prompt 2 |
| Value of reason for video call failure 3 | Reason prompt 3 |

Accordingly, the embodiment of the present disclosure further includes a process of updating a reason prompt corresponding to a value of reason for a video call failure, the process further including: when there is a need to add a new reason for a video call failure and a corresponding reason prompt, receiving and saving the new reason prompt and the corresponding value of the reason for the video call failure sent from the network side, and establishing a correspondence between the corresponding value of the reason for the video call failure and the new reason prompt; or when there is a need to update an existing reason prompt, receiving and saving the updated reason prompt sent from the network side, establishing and saving a correspondence between the updated reason prompt and the corresponding value of the reason for the video call failure so as to replace the correspondence between the reason prompt before being updated and the value of the reason for the video call failure. According to the embodiment of the present disclosure, the updated reason prompt is saved first and then the mapping relationship is updated during the process of updating the reason prompt, so the updating process does not influence the reason prompt being presented or the experience of the subscriber.

According to the embodiment of the present disclosure, the process of acquiring, by the network-side entity, the value of the reason for the video call failure determined by the originating switch, with which the calling terminal is communicated, may be performed by carrying the value of the reason for the video call failure in a single signaling or by carrying the value of the reason for the video call failure in an Initial Address Message (IAM). The process of carrying the value of the reason for the video call failure in an IAM message includes: sending, by the originating switch, an IAM message to the network-side entity with the value of the reason for the video call failure being carried therein. The IAM message may be so configured that a preset value and the value of the reason for the video call failure are carried in a "called number" field of the IAM message, while a called Mobile Station International Integrated Services Digital Network number (MSISDN) may be carried in a "original called number" field of the IAM message, and a calling MSISDN may be carried in a "calling number" field of the IAM message; or that the preset value is carried in the "called number" field of the IAM message, and the value of the reason for the video call failure is carried in a "generic number" field of the IAM message, while the called MSISDN may be carried in the "original called number" field of the IAM message, and the calling MSISDN may be carried in the "calling number" field of the IAM message.

The above preset value is configured to route the IAM message to the network-side entity. The preset value may be a route number of the network-side entity, or a route address of the network-side entity.

It shall be noted that the configuration of the IAM message is described above by means of example, but not limited thereto, and that it is possible to carry the value of the reason for the video call failure by expanding the IAM message in other ways, as far as they fall within the protection scope of the present disclosure.

The specific implementation modes of the embodiments of the present disclosure during practical application will be described in detail below.

Figure 2:
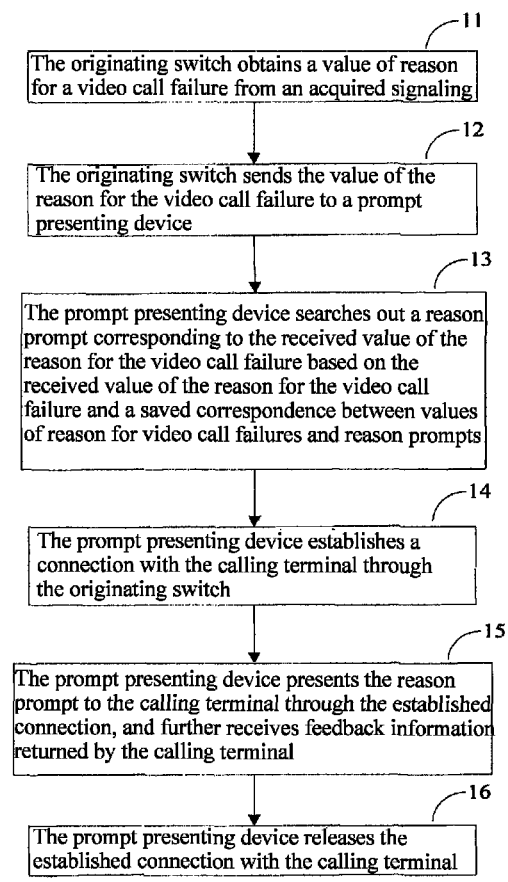
FIG. 2 is a schematic diagram illustrating a procedure of embodiment one of the present disclosure.

In a first embodiment of the present disclosure, when a video call originated by a calling terminal fails, an originating switch, with which the calling terminal is communicated, acquires a signaling carrying the value of the reason for the video call failure sent to the calling terminal. The process of presenting the reason prompt for the video call failure to the calling terminal, as shown in FIG. 2, includes the following steps:

Step 11: The originating switch obtains the value of the reason for the video call failure from the acquired signaling.

Step 12: The originating switch sends the value of the reason for the video call failure to the network-side entity. The value of the reason for the video call failure may be carried in a single signaling or in an IAM message.

Step 13: The network-side entity searches out a reason prompt corresponding to the received value of the reason for the video call failure based on the received value of the reason for the video call failure and a saved correspondence between values of reason for video call failures and reason prompts.

Step 14: The network-side entity establishes a connection with the calling terminal through the originating switch.

Step 15: The network-side entity presents the reason prompt to the calling terminal through the established connection, and may further receive feedback information returned from the calling terminal with respect to the value of the reason for the video call failure. The feedback information sent by the calling terminal may be collected through a DTMF number collecting apparatus.

Step 16: The network-side entity releases the established connection with the calling terminal.

According to the this embodiment of the present disclosure, since the network-side entity can present the reason prompt for the video call failure to the calling subscriber, the reason prompt can be set at the network side so that the reason prompt for the video call failure acquired by the calling subscriber is more accurate, thereby improving the experience of the subscriber. Further, the operator can set the reason prompt for the video call failure according to its needs, and the flexibility in operation at the operator side is enhanced. In addition, with the technical solution according to this embodiment of the present disclosure, feedback information can be also received from the calling subscriber during the process of presenting the reason prompt for the video call failure to the calling subscriber, thereby facilitating the operator to improve the service offered, further improving the experience of the subscriber and benefiting the operator more.

Figure 3:
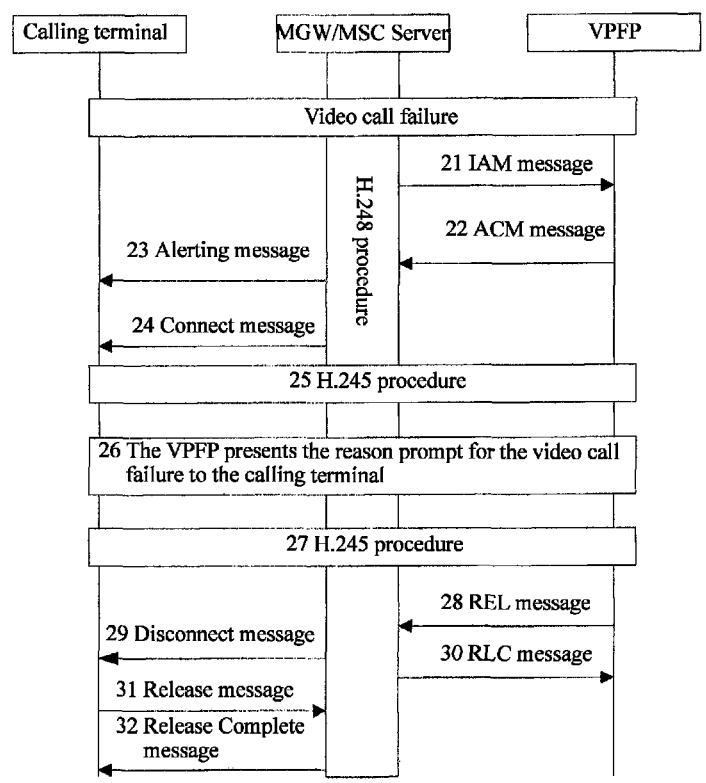
FIG. 3 is a schematic diagram illustrating a procedure of embodiment two of the present disclosure.

A further embodiment of the present disclosure provides an implementation mode of presenting a reason prompt for a video call failure to a calling subscriber in a WCDMA network or a TD-SCDMA network. According to this embodiment of the present disclosure, a network-side entity is arranged at the network side and can be used by a plurality of originating switches. When a video call originated by the calling terminal fails, an originating switch MSC Server, with which the calling terminal is communicated, acquires a signaling carrying the value of reason for the video call failure, which is sent to the calling terminal. The process of presenting the reason prompt for the video call failure to the calling terminal, as shown in FIG. 3, includes the following steps:

Step 21: The MSC Server sends an IAM message carrying the value of the reason for the video call failure to the network-side entity, which may be a Video Phone Failure Process (VPFP) in the example of the present disclosure, to establish a connection with the VPFP.

Step 22: The VPFP returns an Address Complete Message (ACM) to the MSC Server to establish the connection with the MSC Server.

Step 23: The MSC Server sends an Alerting message to the calling terminal in order for the calling terminal to present a ring-back tone in response to the Alerting message.

Step 24: The MSC Server sends a Connect message to the calling terminal to instruct the calling terminal to establish a 3G-324M connection with the VPFP.

Steps 25-27: An H.245 negotiation is performed between the calling terminal and the VPFP; after the negotiation is successful, the VPFP presents to the calling terminal the reason prompt for the video call failure, which is determined by the VPFP based on the value of the reason for the video call failure acquired from the received IAM message and a saved correspondence between values of reason for video call failures and reason prompts; and after the prompt for the video call failure is presented, the VPFP voluntarily disconnects the established media stream connection with the calling terminal.

Steps 28-32: The VPFP voluntarily disconnects this call connection.

In this embodiment of the present disclosure, the flow of implementing a process for the video call failure through an ISDN User Part (ISUP) signaling is illustrated. When a Bearer Independent Call Control (BICC) protocol signaling is used, the processing procedure is analogous to the above.

The second embodiment of the present disclosure provides a solution for presenting, by the network device VPFP, the reason prompt for the video call failure to the calling terminal in the WCDMA network or TD-SCDMA network. Since the reason prompt for the video call failure is presented to the calling subscriber by the VPFP, the reason prompt can be set at the network side so that the reason prompt for the video call failure acquired by the calling subscribed is more accurate, thereby improving the experience of the subscriber. Further, the operator can set the reason prompt for the video call failure according to its needs, and the flexibility in operation at the operator side is enhanced.

Figure 4:
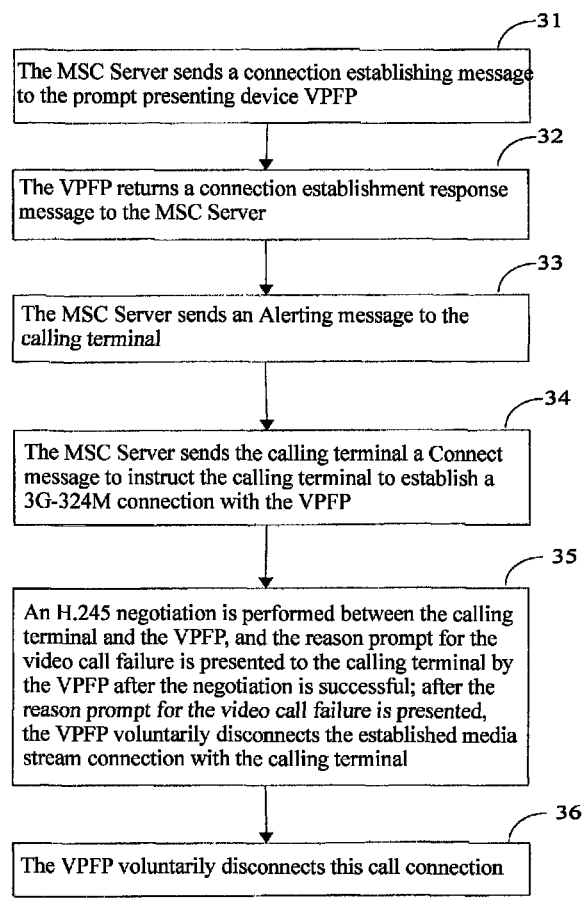
FIG. 4 is a schematic diagram illustrating a procedure of embodiment three of the present disclosure.

A further embodiment of the present disclosure provides a method for presenting a reason prompt for a video call failure to a calling terminal in a WCDMA network or a TD-SCDMA network. In this embodiment of the present disclosure, the network-side entity is arranged in an originating switch as a functional module of the originating switch. When a video call originated by the calling terminal fails, the originating switch MSC Server where the calling terminal is located acquires a signaling carrying a value of reason for a video call failure, which is sent to the calling terminal. The process of presenting the reason prompt for the video call failure to the calling terminal, as shown in FIG. 4, includes the following steps:

Step 31: The MSC Server sends the VPFP a connection establishing message carrying the value of the reason for the video call failure.

Step 32: The VPFP returns a connection establishment response message to the MSC Server to establish a connection with the MSC Server.

Step 33: The MSC Server sends an Alerting message to the calling terminal in order for the calling terminal to present a ring-back tone according to the Alerting message.

Step 34: The MSC Server sends a Connect message to the calling terminal to instruct the calling terminal and the VPFP to establish a 3G-324M connection.

Step 35: An H.245 negotiation is performed between the calling terminal and the VPFP; after the negotiation is successful, the VPFP presents to the calling terminal a reason prompt for the video call failure, which is determined by the VPFP based on the value of the reason for the video call failure acquired in the received IAM message and a saved correspondence between values of reason for video call failures and reason prompts; and after the reason prompt for the video call failure is presented, the VPFP voluntarily disconnects the established media stream connection with the calling terminal.

Step 36: The VPFP voluntarily disconnects this call connection.

In this embodiment of the present disclosure, the message transmitted between the VPFP and the MSC Server is an internal signaling of the MSC Server.

The this embodiment of the present disclosure provides a solution for presenting, by the network device VPFP, the reason prompt for the video call failure to the calling terminal in the WCDMA network or TD-SCDMA network. Since the reason prompt for the video call failure is presented to the calling subscriber by the VPFP, the reason prompt can be set at the network side so that the reason prompt for the video call failure acquired by the calling subscribed is more accurate, thereby improving the experience of the subscriber. Further, the operator can set the reason prompt for the video call failure according to its needs, and the flexibility in operation at the operator side is enhanced.

All or some steps of the methods of the above embodiments can be performed by a program instructing a relevant hardware. The program can be stored in a computer readable storage medium. When the program is executed, the steps of the methods of the above embodiments are executed. The storage medium includes various media capable of storing program codes such as ROM, RAM, disk and compact disc.

Figure 5:
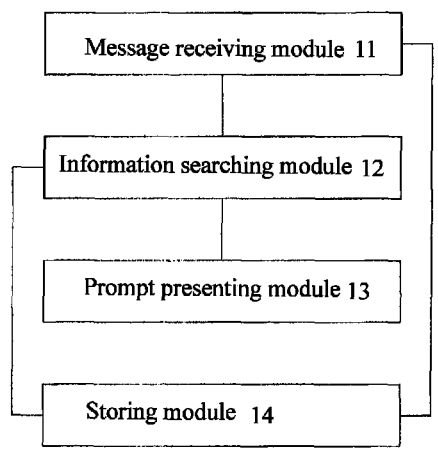
FIG. 5 is a schematic diagram illustrating a configuration of a prompt presenting device according to an embodiment of the present disclosure.

An embodiment of the present disclosure further provides a device for presenting a reason prompt for a video call failure, the implementation configuration of which, as shown in FIG. 5, includes: a message receiving module 11, configured to receive a value of reason for a video call failure sent from an originating switch, with which the calling terminal is communicated; an information searching module 12, configured to determine a reason prompt corresponding to the value of the reason for the video call failure received by the message receiving module 11; and a prompt presenting module 13, configured to present the reason prompt to the calling terminal.

In the embodiment of the present disclosure, since the device at the network side presents the reason prompt for the video call failure to the calling subscriber, the content of the reason prompt can be set at the network side so that the reason prompt for the video call failure acquired by the calling subscriber is more accurate, thereby improving the experience of the subscriber. Furthermore, the operator can set the reason prompt for the video call failure according to its needs, and the flexibility in operation at the operator side is enhanced.

In the device according to the embodiment of the present disclosure, the prompt presenting module 13 is further configured to establish a connection with the calling terminal through the originating switch, and to present the reason prompt for the video call failure to the calling terminal through the established connection with the calling terminal. The process may include: establishing a 3G-324M connection with the calling terminal through the originating switch; performing an H.245 negotiation with the calling terminal through the connection; and after the negotiation is successful, presenting the reason prompt to the calling terminal. After the prompt is presented, the established connection with the calling terminal is released.

With the technical solution according to the embodiment of the present disclosure, it is possible for the operator to set the reason prompt for video call failure in accordance with its needs; for example, an ad may be inserted during the process of presenting the reason prompt for video call failure. To acquire feedback information from the subscriber, in the device according to the embodiment of the present disclosure, the message receiving module 11 is further configured to receive feedback information from the subscriber after the prompt presenting module 13 presents the reason prompt to the calling terminal through the established connection and before the established connection with the calling terminal is released, so as to perform a corresponding operation according to the feedback information. The process of receiving the feedback information from the subscriber may be further performed by additionally arranging a DTMF number receiving apparatus.

The device of the present disclosure further includes a storing module 14 configured to save a correspondence between values of reason for video call failures and reason prompts. The information searching module 12 is further configured to acquire the reason prompt corresponding to the value of the reason for the video call failure according to the saved correspondence between the values of reason for video call failures and the reason prompts.

In the device according to the embodiment of the present disclosure, the message receiving module 11 is further configured to acquire an added reason prompt and a value of reason for a video call failure corresponding thereto. The storing module 14 is further configured to save the reason prompt and the corresponding value of the reason for the video call failure received by the message receiving module 11, and establish a correspondence between the value of the reason for the video call failure and the reason prompt. Alternatively, the message receiving module 11 is further configured to acquire the updated reason prompt, and the storing module 14 is further configured to save the updated reason prompt received by the message receiving module 11, and establish a correspondence between the updated reason prompt and the corresponding value of the reason for the video call failure to replace the correspondence between the reason prompt before being updated and the value of the reason for the video call failure.

The device according to the embodiment of the present disclosure may be separately provided at the network side, and configured to present reason prompts to calling terminals under a plurality of originating switches. Alternatively, the device may be provided on an originating switch apparatus at the network side, as a functional module in the originating switch. That is, the embodiment of the present disclosure may further provide an originating switch apparatus including the above device for presenting a reason prompt for video call failure to a calling terminal. The device (entity) located at the network side herein may be referred to the network-side entity in the above embodiments.

The above description is made only to preferable embodiments of the present disclosure. However, the protection scope of the present disclosure is not limited thereto, and those modifications or substitutions that are easily conceivable to persons skilled in the art within the technical scope disclosed in the present disclosure will fall within the protection scope of the present disclosure. Therefore, the protection scope of the present disclosure shall be defined by the claims.

What is claimed is:

1. In a network-side entity, a method for presenting a reason prompt for a video call failure, comprising:
    acquiring a value of reason for the video call failure determined by an originating switch, with which a calling terminal is communicated;
    acquiring the reason prompt corresponding to the value of the reason for the video call failure according to a saved correspondence between values of reason for video call failures and reason prompts, wherein the saved correspondence and the reason prompts are saved in the network-side entity;
    establishing a media stream connection with the calling terminal through the originating switch after acquiring the reason prompt corresponding to the value of the reason for the video call failure;
    performing a negotiation with the calling terminal; and
    based on the established media stream connection, presenting the reason prompt to the calling terminal.

2. The method according to claim 1, wherein after the process of presenting the reason prompt to the calling terminal through the established media stream connection with the calling terminal, the method further comprises: releasing the established media stream connection with the calling terminal.

3. The method according to claim 2, wherein before the process of releasing the established media stream connection with the calling terminal, the method further comprises: receiving feedback information from a subscriber with respect to the reason prompt for the video call failure.

4. The method according to claim 1, further comprising: updating the reason prompt corresponding to the value of the reason for the video call failure, wherein the updating process comprises at least one step of the group consisting of:
    acquiring an added reason prompt and a value of reason for a video call failure corresponding thereto, establishing and saving a correspondence between the added reason prompt and the corresponding value of the reason for the video call failure; and
    acquiring an updated reason prompt; establishing and saving a correspondence between the updated reason prompt and a value of reason for a video call failure corresponding thereto so as to replace the correspondence between the reason prompt before being updated and the value of the reason for the video call failure.

5. The method according to claim 1, wherein the process of acquiring the value of the reason for the video call failure determined by the originating switch, with which the calling terminal is communicated, comprises:
    receiving an initial address message (IAM) sent from the originating switch, wherein the IAM message carries the value of the reason for the video call failure.

6. The method according to claim 5, wherein a preset value and the value of the reason for the video call failure are carried in a "called number" field in the IAM message; and the preset value is configured to route the IAM message to the network-side entity.

7. A device for presenting a reason prompt for a video call failure, comprising:
    a message receiving module, configured to acquire a value of reason for the video call failure determined by an originating switch, with which a calling terminal is communicated;
    an information searching module, configured to determine a reason prompt corresponding to the value of the reason for the video call failure acquired by the message receiving module;
    a prompt presenting module, configured to establish a media stream connection with the calling terminal through the originating switch after the information searching module determined the reason prompt corresponding to the value of the reason for the video call failure acquired by the message receiving module, perform a negotiation with the calling terminal, and based on the established media stream connection, present the reason prompt to the calling terminal, and
    a storing module configured to save a correspondence between values of reason for video call failures and reason prompts, wherein the saved correspondence and the reason prompts are saved in the network-side entity;
    wherein the information searching module is further configured to acquire the reason prompt corresponding to the value of the reason for the video call failure according to the correspondence between the values of the reason for the video call failures and the reason prompts saved in the storing module.

8. The device according to claim 7, wherein the prompt presenting module is further configured to release the established media stream connection with the calling terminal after the process of presenting the reason prompt to the calling terminal through the established media stream connection with the calling terminal.

9. The device according to claim 8, wherein the message receiving module is further configured to receive feedback information from a subscriber with respect to the reason prompt for the video call failure before the prompt presenting module releases the established media stream connection with the calling terminal.

10. The device according to claim 7, wherein the message receiving module is further configured to acquire an added reason prompt and a value of reason for a video call failure corresponding thereto, and the storing module is further configured to save the added reason prompt and the corresponding value of the reason for the video call failure received by the message receiving module, and establish a correspondence between the corresponding value of the reason for the video call failure and the added reason prompt.

11. The method according to claim 5, wherein the preset value is carried in the "called number" field in the IAM message, and the value of the reason for the video call failure is carried in a "generic number" in the IAM message; and the preset value is configured to route the IAM message to the network-side entity.

12. The device according to claim 7, wherein the message receiving module is further configured to acquire an updated reason prompt; and the storing module is configured to save the updated reason prompt received by the message receiving module, and establish a correspondence between the updated reason prompt and a corresponding value of reason for a video call failure to replace the correspondence between the reason prompt before being updated and the value of the reason for the video call failure.

* * * * *

UNITED STATES PATENT AND TRADEMARK OFFICE
CERTIFICATE OF CORRECTION

| | | |
|---|---|---|
| PATENT NO. | : 8,614,736 B2 | Page 1 of 1 |
| APPLICATION NO. | : 12/753545 | |
| DATED | : December 24, 2013 | |
| INVENTOR(S) | : Huang | |

It is certified that error appears in the above-identified patent and that said Letters Patent is hereby corrected as shown below:

On the title page item [71], Applicant's City of Residence "Guangdong (CN)" should read -- Shenzhen (CN) --.

Signed and Sealed this
Twentieth Day of May, 2014

Michelle K. Lee
*Deputy Director of the United States Patent and Trademark Office*